Figure 1:
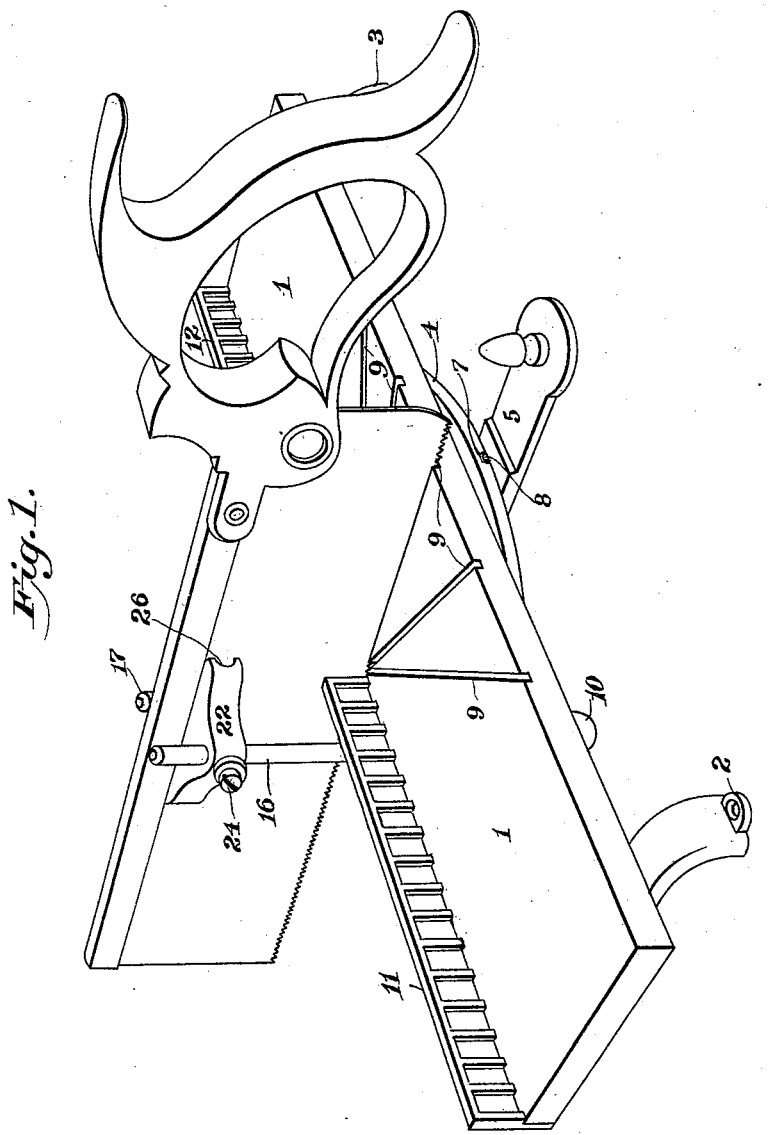

(No Model.) 4 Sheets—Sheet I.

T. E. KING.
MITER BOX.

No. 544,042. Patented Aug. 6, 1895.

WITNESSES:
J. F. Finch
M. J. Longden.

INVENTOR
Theo. E. King
BY
ATTORNEY (No Model.) 4 Sheets—Sheet 2.
T. E. KING.
MITER BOX.
No. 544,042. Patented Aug. 6, 1895.
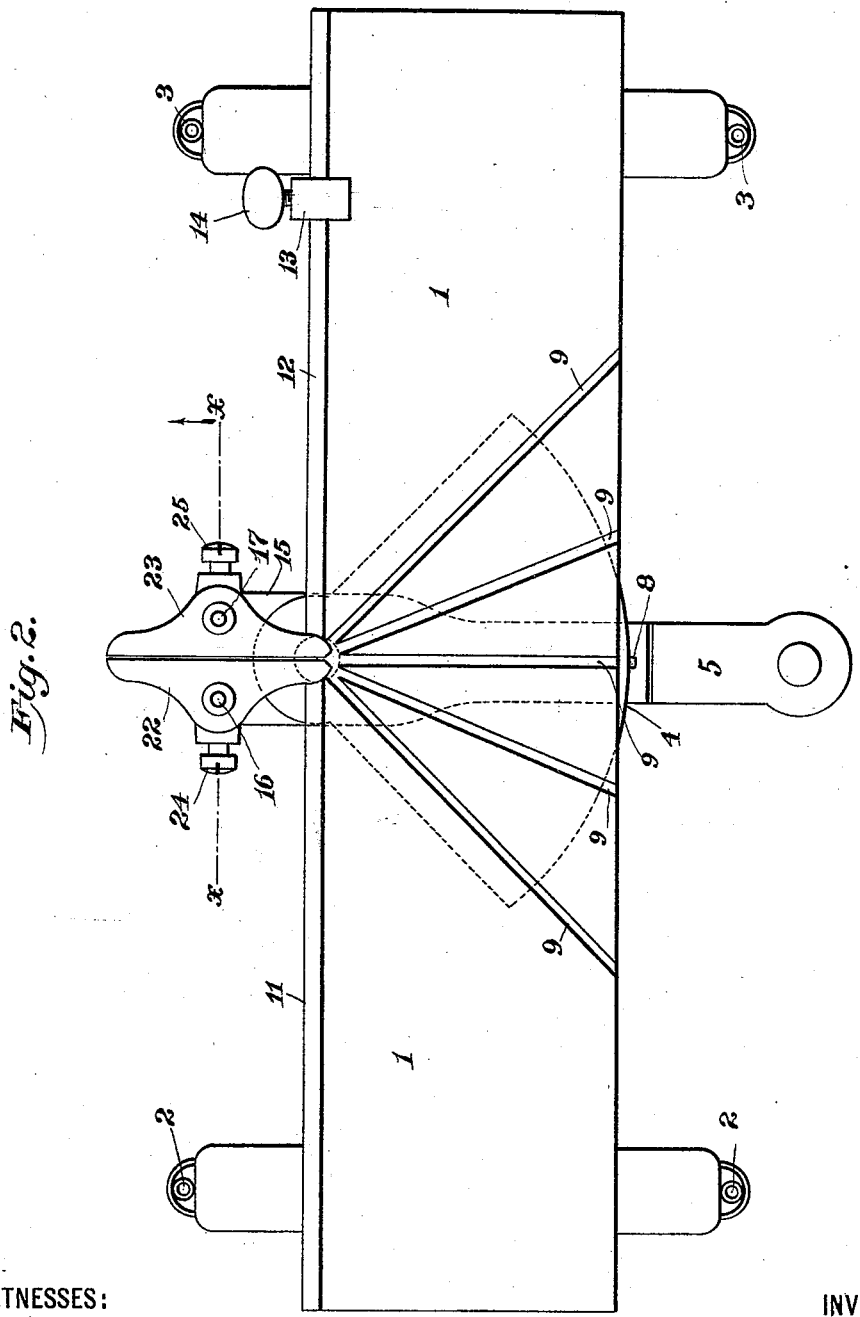
WITNESSES:
J. F. Finch.
M. S. Lougden
INVENTOR
Theo. E. King
BY
ATTORNEY

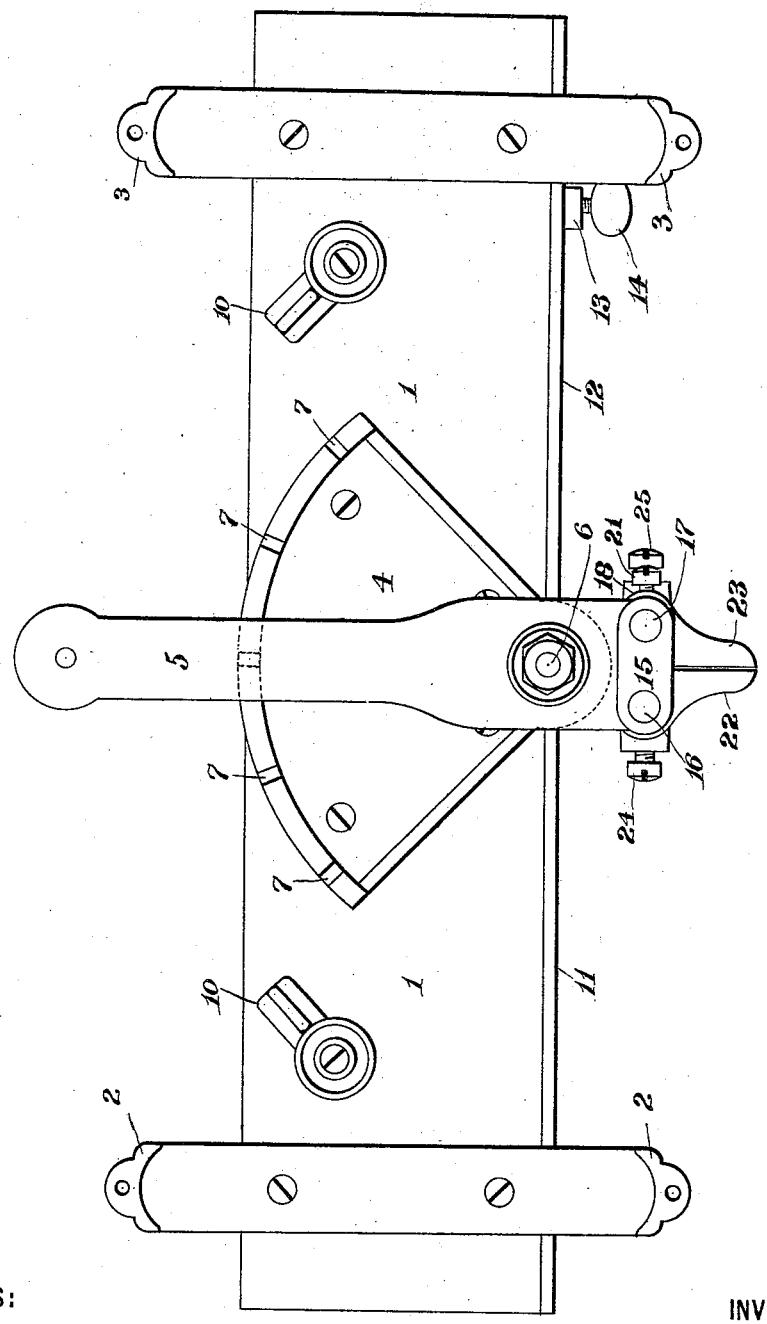

(No Model.) 4 Sheets—Sheet 4.
T. E. KING.
MITER BOX.
No. 544,042. Patented Aug. 6, 1895.
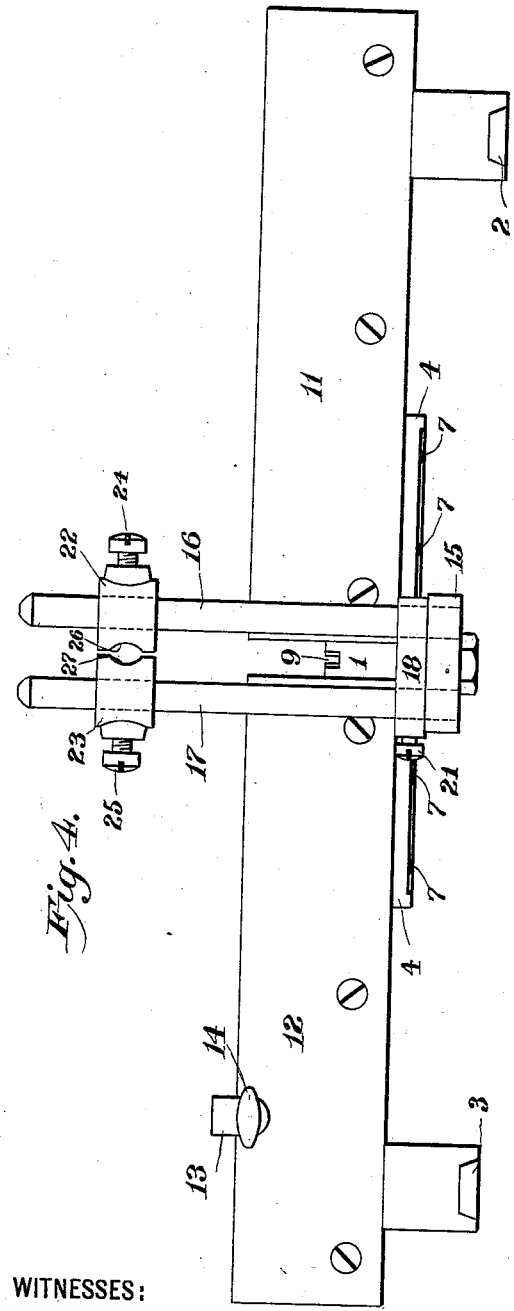
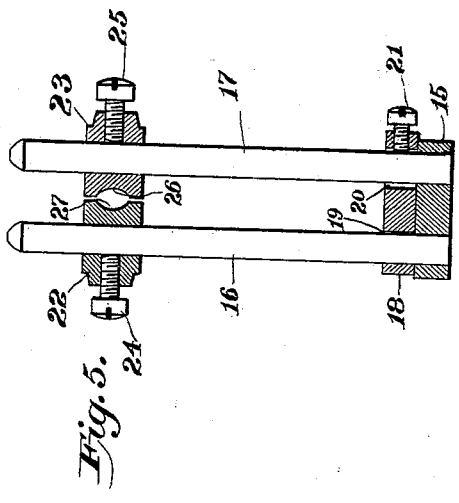
WITNESSES:
INVENTOR
Theo. E. King
BY
ATTORNEY

UNITED STATES PATENT OFFICE.

THEODORE E. KING, OF WESTPORT, CONNECTICUT.

MITER-BOX.

SPECIFICATION forming part of Letters Patent No. 544,042, dated August 6, 1895.

Application filed April 20, 1895. Serial No. 546,544. (No model.)

*To all whom it may concern:*

Be it known that I, THEODORE E. KING, a citizen of the United States, residing at Westport, in the county of Fairfield and State of Connecticut, have invented certain new and useful Improvements in Miter-Boxes; and I do hereby declare the following to be a full, clear, and exact description of the invention, such as will enable others skilled in the art to which it appertains to make and use the same.

My invention relates to certain new and useful improvements in miter-boxes, and has for its object to provide a simple and effective device of this description, and furthermore to improve upon and simplify the construction shown and described in Letters Patent No. 506,433, issued to me October 10, 1893.

In the accompanying drawings, which form a part of this application, Figure 1 is a perspective showing my improvement with the saw in position thereon; Fig. 2, a plan view; Fig 3, a bottom view; Fig. 4, a rear elevation, and Fig. 5 a section at the line $x\,x$ of Fig. 2.

Similar numbers of reference denote like parts in the several figures of the drawings.

1 is the platform of the box.

2 3 are legs arranged in pairs and secured to the bottom of the platform, and 4 is a quadrantal plate secured to the bottom of the platform at or about its middle portion.

5 is a swing-bar pivoted at 6 to the inner or apex end of the plate 4, said bar being capable of a resilient action.

7 are notches in the under side of the circular or outer edge of the plate at predetermined distances apart, and 8 is a stud carried by the bar 5 and capable of engaging with said notches, whereby said bar may be held in various adjustments. By simply depressing the outer extremity of the bar the latter will be sprung sufficiently to release the stud from the notches, so that the bar may be swung around.

9 are grooves in the surface of the platform and radiating from a common center coincident with the pivotal point of the bar 5, for the purpose of allowing the saw to pass entirely through the piece to be mitered, as is usual in devices of this description.

Secured to the bottom of the platform are stops 10 on each side of the plate 4, against which the bar 5 abuts at the extreme limits of its swinging movements.

Secured to the back of the platform and projecting upwardly are the usual back pieces 11 12; and 13 is a gage, which I have shown on the back piece 12 as adjustably attached by means of a set-screw 14. The object of this gage is to afford an adjustable stop, against which a molding or other work to be mitered may abut.

The swing-bar at its inner end has an extension 15 beyond its pivotal-point, and secured within this extension are two vertical rods 16 17. As shown in Fig. 3, the swing-bar is held firmly up against the bottom of the quadrantal or angle-plate 4 by nut 40 and washer 41 on pivot 6. The short extension 15 of the swing-bar is rigid and does not yield perceptibly when the front part of the bar is sprung. 18 is a yoke-block, which rests on top of said extension, and is provided with perforations 19 20, through which said rods pass. The rod 16 snugly fits within the perforation 19, while the perforation 20 is larger, so that the rod 17 is loose therein.

21 is a set-screw driven through the end of the yoke-block against the rod 17. By setting this screw inward against this rod 17 the two cylindrical rods 16 17 will be slightly sprung toward each other, and if this screw is backed these rods will, by their resiliency, return to normal position.

22 23 are jaws, which have cylindrical openings, through which rods 16 17 pass, as shown. The jaws are secured on the rods 16 17 by means of set-screws 24 25, so that it will be readily understood that said jaws may be adjusted along said rods at any desired elevation. The inner faces of these jaws are cut away, as seen at 26 27, so as to offer as little frictional resistance as possible to the saw-blades, while the upper and lower edges of the faces are separated by a space which is just sufficient to accommodate the blade of a saw, the upper surfaces of these jaws affording a rest for the back of the saw, as clearly seen at Fig. 1. Considerable annoyance has been experienced in devices of this description on account of the irregularity of the work performed, owing to the lack of uniformity as to thickness of the saw-blades. When these jaws are normally separated by a certain space, a very thin saw-blade, which does not closely fit within such space, will wabble and will cut very irregularly. Also constant use of saw-blades will wear away the inner edges of these jaws to the extent that a lack of uniformity results in the mitering operation. The forcing of these rods 16 and 17 toward each other by means of the set-screw 24 not only compensates for the wear of the inner edges of the jaws, but also causes these jaws to snugly embrace the sides of the saw-blade, and thereby hold the latter as against any side play.

The manner in which the jaws 22 23 are secured to the rods 16 17 is particularly advantageous, for the reason that in initially binding these jaws to said rods the position of the jaws must be such that the saw should stand at right angles to the platform 1, or, in other words, within the central groove 9. This is effected by simply swinging the jaws into the desired position and then binding them securely by means of the set-screws 24 25. It will thus be obvious that when the bar 5 is swung the jaws will be bodily carried around with said bar, while at the same time the space between the jaws will always be in the same plane with the groove 9, within which the saw finally rests when its operation is completed.

Having thus described my invention, what I claim as new, and desire to secure by Letters Patent, is—

1. In a mitering device, the combination of the platform, the angle plate secured thereto, the angle bar pivoted thereon and adjustable to suitable positions, the vertical cylindrical rods secured to the extension of said bar, the yoke block having perforations through which these rods pass, one of the perforations being larger than the rod passing through it and having a set screw to clasp the rod therein, and jaws secured to said bars in position to bear against the saw blade, all substantially as described.

2. In combination with the platform, angle plate, and angle bar pivoted thereto, the flexible vertical cylindrical rods secured to the angle bar, means for flexing these rods with relation to each other, and a jaw on each rod, said jaw having an opening through which the rod passes and adjustable to any height and circumferentially adjustable thereon by means of a set screw, all substantially as described.

In testimony whereof I affix my signature in presence of two witnesses.

THEODORE E. KING.

Witnesses:
F. W. SMITH, Jr.,
M. T. LONGDEN.